United States Patent [19]

Smith

[11] Patent Number: 5,465,946

[45] Date of Patent: Nov. 14, 1995

[54] POSITIONING FIXTURE FOR WELDING OPERATIONS HAVING A LOCKABLE BALL JOINT

[76] Inventor: Dresden G. Smith, 1621 English Dr., San Jose, Calif. 95129

[21] Appl. No.: 185,504

[22] Filed: Jan. 24, 1994

Related U.S. Application Data

[63] Continuation-in-part of Ser. No. 634,565, Dec. 27, 1990, Pat. No. 5,280,892.

[51] Int. Cl.$^6$ ........................................................ B23Q 1/32
[52] U.S. Cl. ................... 269/75; 269/22; 269/62; 269/290; 269/900; 248/288.51
[58] Field of Search ................... 269/74, 75, 16, 269/22, 24, 29, 30, 56, 57, 59, 62, 289 R, 290, 292, 293, 304, 900; 248/288.3, 288.5

[56] References Cited

U.S. PATENT DOCUMENTS

| | | | |
|---|---|---|---|
| 2,559,925 | 7/1951 | Barker | 269/75 |
| 4,702,465 | 10/1987 | McConnell | 269/328 |
| 5,224,692 | 7/1993 | Anderson | 269/75 |

FOREIGN PATENT DOCUMENTS 1014809  11/1964  United Kingdom ............... 269/75

Primary Examiner—Bruce M. Kisliuk
Assistant Examiner—Eileen P. Morgan
Attorney, Agent, or Firm—James J. Leary

[57] ABSTRACT

A positioning fixture which allows two or more parts to be positioned in proper spatial relationship to one another and then allows the parts which are clamped together to be repositioned while maintaining the spatial relationship between the parts. The positioning fixture has a flat working surface which is compatible with a variety of standard and custom clamping mechanisms for holding and positioning the parts to be welded. The working surface with the parts clamped to it is tiltable to a wide range of working positions. The tilting feature is provided by mounting the working surface on a locking ball joint which is operated by a foot pedal through a mechanical or pneumatic mechanism. The locking ball joint also provides electrical isolation between the work surface and the base of the positioning fixture which is important when using electrical welding methods.

12 Claims, 9 Drawing Sheets

2

POSITIONING FIXTURE FOR WELDING OPERATIONS HAVING A LOCKABLE BALL JOINT

RELATIONSHIP TO OTHER APPLICATIONS

This patent application is a continuation-in-part of the patent application of Dresden G. Smith for a Positioning Fixture For Welding Operations, Ser. No. 07/634,565 filed Dec. 27, 1990 which issued as U.S. Pat. No. 5,280,892 on Jan. 25, 1994, the specification of which is hereby incorporated by reference in its entirety.

FIELD OF THE INVENTION

The present invention relates generally to a positioning fixture for holding objects during welding or assembly operations. More specifically the invention relates to a lockable tilting table to which workpieces can be clamped and the whole assembly positioned in an optimum position for welding or assembly operations.

BACKGROUND OF THE INVENTION

Frequently in the course of a welding or assembly operation it is necessary to temporarily clamp two or more parts together in proper spatial relationship prior to welding or assembling. It is also frequently desirable to be able to reposition the clamped assembly for convenient access to the joints to be welded without disturbing the spatial relationship of the clamped parts.

One invention which fulfills the first of these needs is described in U.S. Pat. No. 5,280,892 for a Positioning Fixture For Welding Operations. This prior invention has a lockable articulated clamping arm that allows objects to be conveniently positioned in proper spatial relationship to one another prior to welding. What this and other prior inventions lack is a convenient way to reposition the clamped assembly while preserving the spatial relationship of the parts.

SUMMARY OF THE INVENTION

In accordance with the foregoing discussion, one objective of the present invention is to provide a positioning fixture which allows two or more parts to be positioned in proper spatial relationship to one another. To this end, the positioning fixture provides a flat working surface which is compatible with a variety of standard and custom clamping mechanisms for holding and positioning the parts to be welded.

A second objective is to provide a positioning fixture which allows parts which are clamped together to be repositioned while maintaining the spatial relationship between the parts. To fulfill this objective, the positioning fixture is made so that the working surface with the parts clamped to it is tiltable to a wide range of working positions. The tilting feature is provided by mounting the working surface on a locking ball joint which is operated by a foot pedal through a mechanical or pneumatic mechanism. The locking ball joint also provides electrical isolation between the work surface and the base of the positioning fixture which is important when using electrical welding methods. Other objects and advantages of the invention will become evident to those skilled in the art by reading and understanding the following detailed description along with the accompanying drawings.

DETAILED DESCRIPTION OF THE INVENTION

Figure 1:
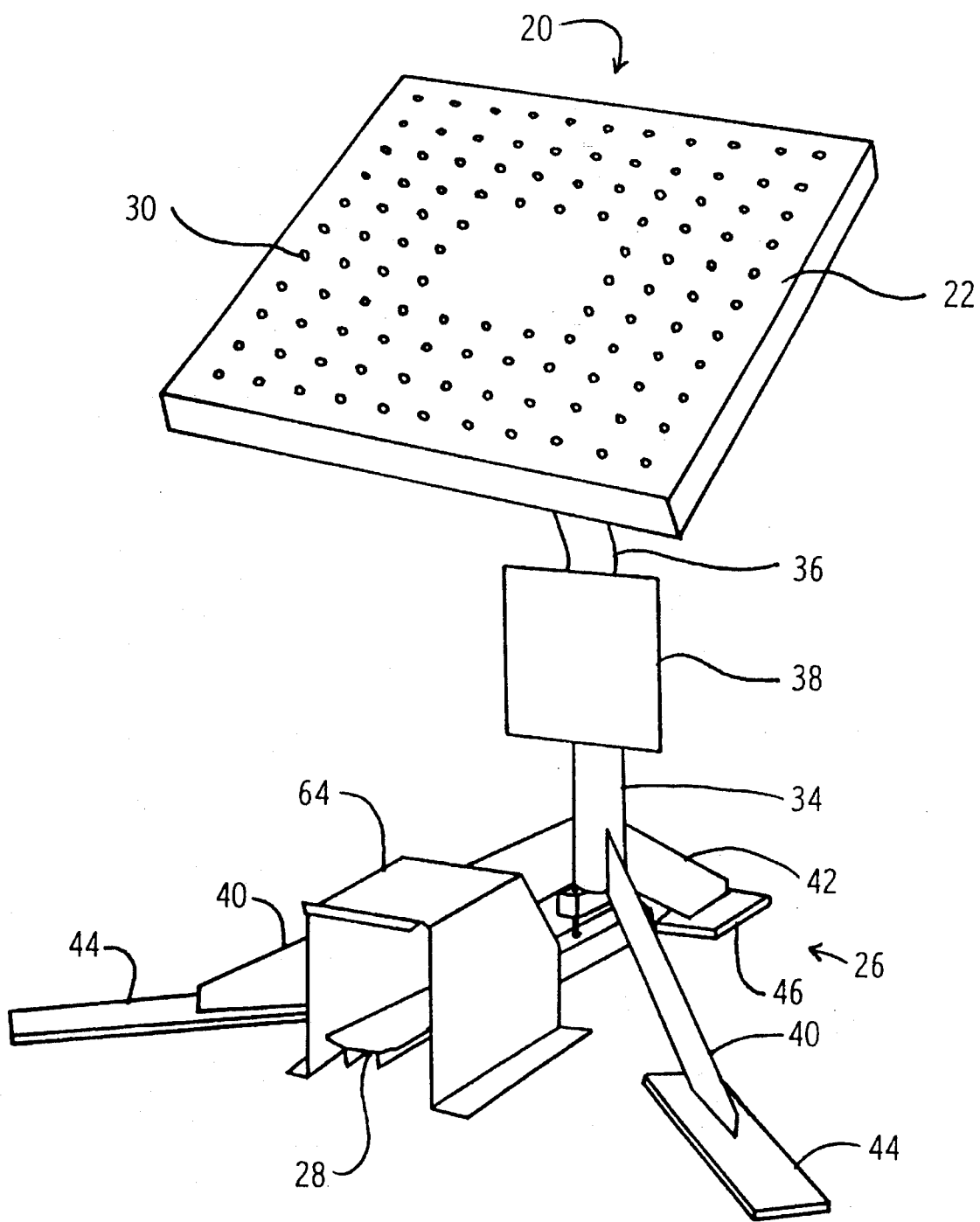
FIG. 1 shows a front perspective view of a mechanically actuated embodiment of the positioning fixture.

FIG. 1 shows a front perspective view of a first embodiment of the positioning fixture 20 of the present invention. The positioning fixture 20 has a tiltable working surface 22 mounted by means of a mechanically actuated locking ball joint 24 (not visible in this view) to a tripod base 26. The locking ball joint 24 is actuated through a lever and cable mechanism by the foot pedal 28. In this view, the working surface 22 is shown tilted forward from the horizontal position.

In the preferred embodiment, the tiltable working surface 22 is made from a sheet of 3/16 inch thick aluminum. The working surface 22 has dimensions of 24 inches by 24 inches. The edges of the working surface 22 are bent downward 2 inches and the corners are welded to obtain maximum stiffness. A matrix of 1/2 inch holes 30 are drilled in the working surface 22 on 2 inch centers for attachment of various clamping devices. Aluminum is the preferred material for the working surface 22 because of its favorable strength to weight ratio and also because molten metal from welding or brazing operations will tend to bead up rather than stick to the aluminum surface. Other metals, such as steel or stainless steel, would also be acceptable materials for the working surface 22.

Figure 2:
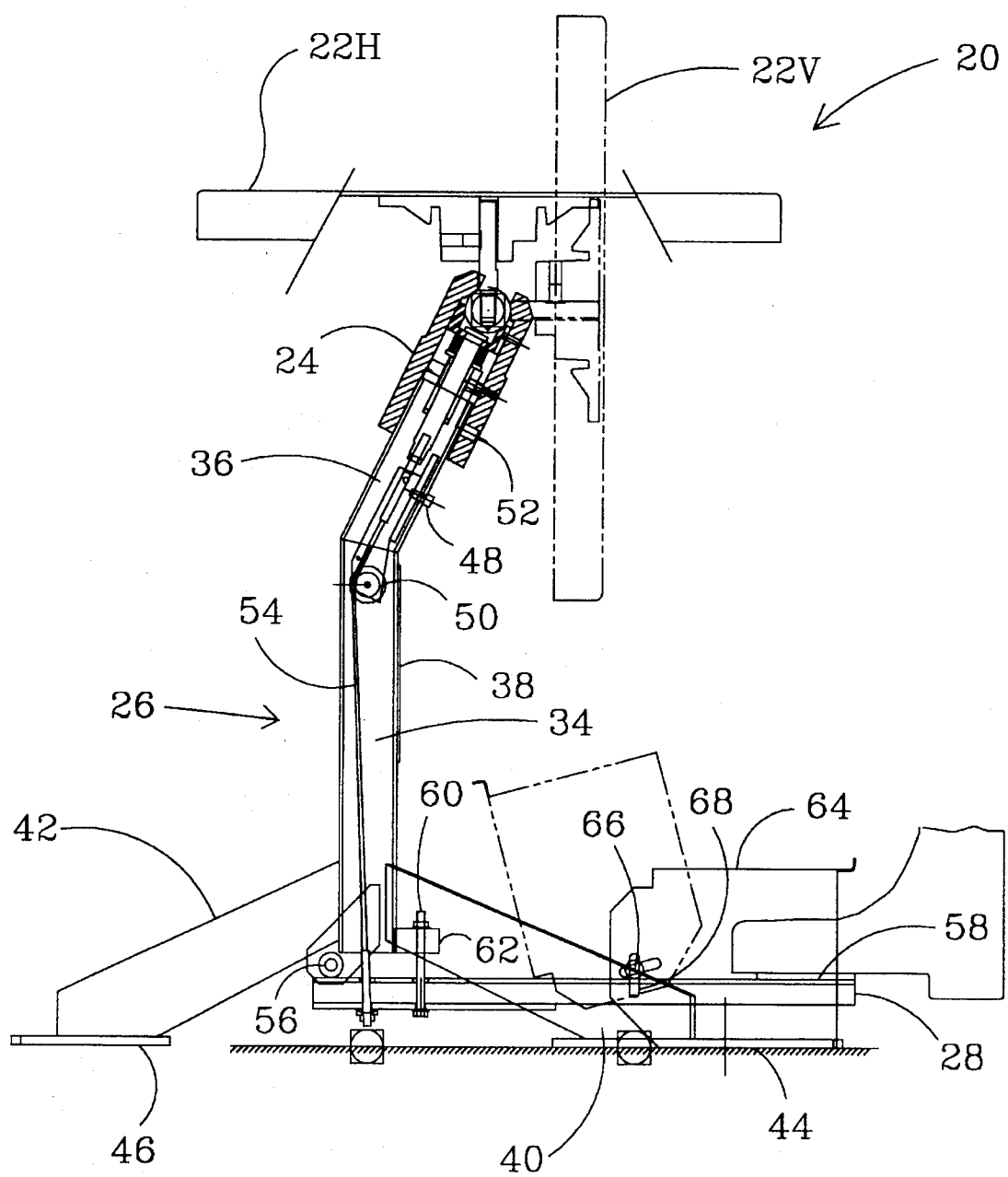
FIG. 2 shows a side view of the mechanically actuated positioning fixture in cross section.
Figure 3:
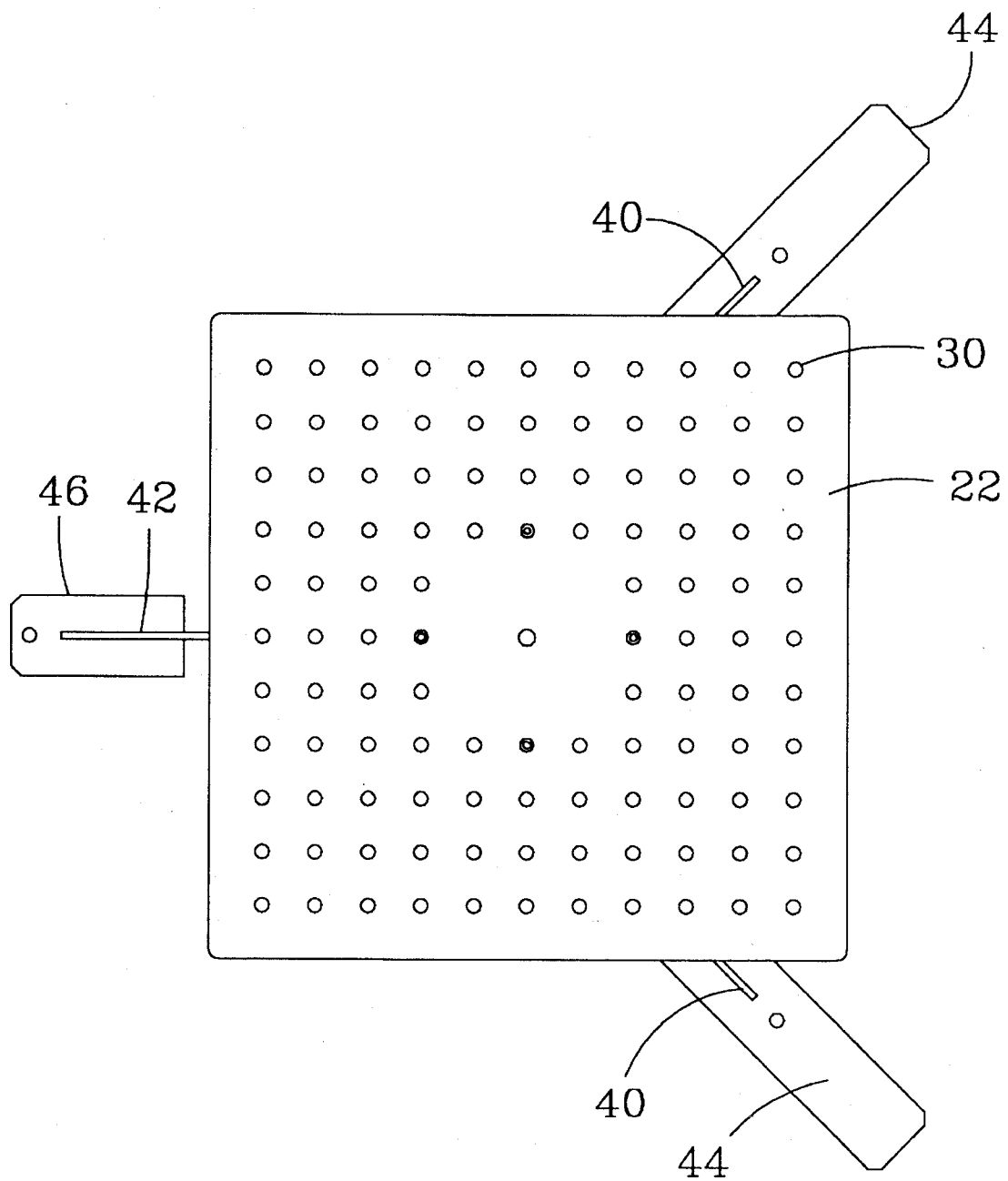
FIG. 3 shows a top view of the mechanically actuated positioning fixture.

A cross section of the mechanically actuated positioning fixture 20 is shown in FIG. 2. The tripod base 26 is a welded steel assembly. It has a central column 34 made of 2 inch pipe. Three webs 40, 42 are welded to the bottom end of the column 34 and footpads 44, 46 are welded to the underside of the webs 40, 42 to form the three legs of the tripod. The rearward extending leg has a short web 42 and a small footpad 46 and the two forward extending legs have longer webs 40 and larger footpads 44. All three footpads have 1/2 inch holes drilled through them for optionally bolting the positioning fixture 20 to the shop floor. The longer webs 40 and larger footpads 44 on the forward legs lend stability to the positioning fixture 20 and help to prevent the fixture from tipping over forward in installations where the footpads are not bolted to the floor. The preferred positions of the legs and footpads for proper stability of the positioning fixture 20 can best be seen in the top view shown in FIG. 3. It should be noted that for safety this first embodiment of the invention should not be equipped with wheels or casters on the legs because the relatively high force needed to operate the foot pedal 28 could cause the fixture to move or to topple when the pedal is depressed.

Returning now to FIG. 2, the central column has a lower vertical section 34 which is welded to a tilted top section 36. The top section 36 of the column leans forward at an angle of 26° from the vertical. A hole 48 is drilled in the top section 36 for mounting a pulley assembly 50 inside of the column. The locking ball joint 24 is mounted at the upper end of the tilted top section 36 of the central column. The locking ball joint 24 is held in place by a set screw 52 which bears against the exterior of the column. The tiltable working surface 22 is attached to the central column 36 via the locking ball joint 24. The locking ball joint 24 gives the tiltable working surface 22 a full range of motion from a horizontal position 22H to a vertical position 22V which is shown in phantom lines.

In this embodiment, the locking ball joint 24 is actuated by a 3/16 inch aircraft cable 54. The cable 54 connects to the locking ball joint 24 and runs through the interior of the column, over the pulley 50 at the column joint and down to the foot pedal 28. The cable 54 attaches to the foot pedal 28 just below the centerline of the column. The foot pedal 28 is 22 inches long and is pivoted at a location 1.5 inches rearward of the column centerline. The distance from the fulcrum 56 of the foot pedal 28 to the center of the step pad 58 on the foot pedal is 19 inches. This gives the foot pedal 28 a leverage of 19/1.5 or a 12.67 multiplication of the operator foot force exerted on the cable 54. An 80 pound force on the pedal 28 results in a tension of approximately 1000 pounds on the cable 54. Immediately forward of the column is a bolt 60 which is restrained by an oversized hole in a block 62 welded to the forward lower end of the column 34. This bolt 60 extends through the foot pedal 28 and a serves as a stop to prevent overextension of the cable 54 or damage to the ball joint assembly 24 by excessive force on the pedal 28.

For safety the foot pedal is provided with a pedal cover 64 which is pivotally attached to the pedal 28. The pedal cover 64 pivots on a pair of pins 66 which extend outward from the pedal 28 and engage a pair of slots 68 in the cover 64. The pedal cover 64 can be pivoted up out of the way, as shown by the phantom lines. When the cover 64 is in the down position, it rests on the floor and the pins 66 move up and down within the vertical slots 68 so that it does not interfere with the motion of the pedal. Alternatively, a 3/8 inch diameter pipe can be welded to the foot pedal 28 to serve as a pivot and single 1/4 inch shaft put through both slots and held in place by grip rings on each end of the shaft.

There is an 8 inch square sheet metal plate 38 welded to the front of the vertical portion of the column. This plate is for mounting a combination nameplate and operating instructions decal.

Figure 4:
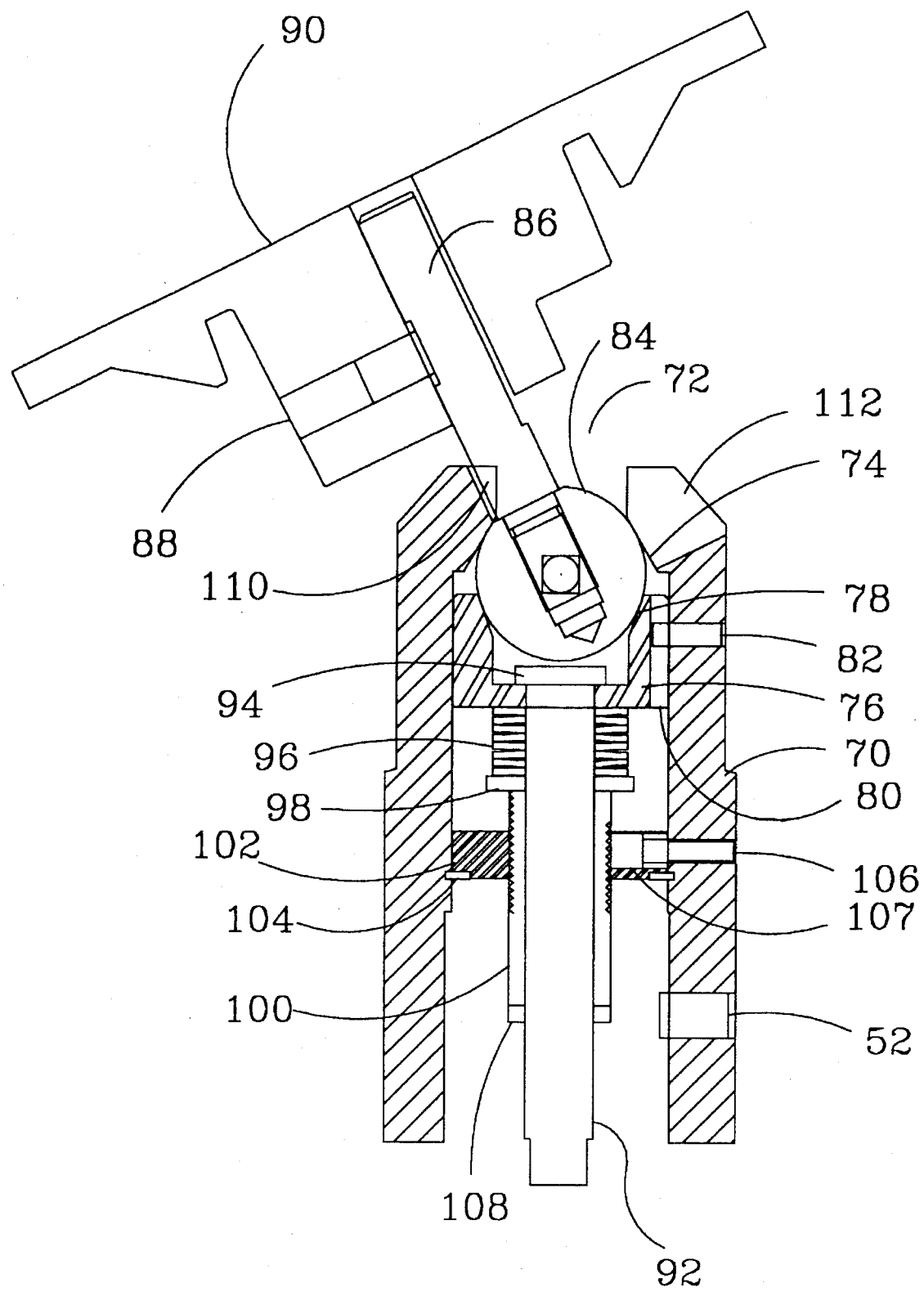
FIG. 4 shows a cross section of the mechanically actuated locking ball joint.

The mechanically actuated locking ball joint assembly 24 is shown in detail in FIG. 4. The ball joint assembly 24 has a cast aluminum body 70 with a through bore 72. There is a conical surface 74 inside the upper end of the bore 72. A cup 76 with a conical upper surface 78 is slidingly received within the bore 72 of the body 70. A keyway 80 in the side of the cup 76 cooperates with a dowel pin 82 pressed through a hole in the body 70 to prevent the cup 76 from rotating relative to the body 70. A ball 84 is held captive in the plenum created between the conical surface 74 of the body 70 and the conical upper surface 78 of the cup 76. The ball 84 has a shaft 86 extending from it through the opening 72 in the upper end of the body 70. The shaft 86 is attached by a set screw 88 to the flanged adapter 90 which, in turn, is attached to the working surface 22 (see FIG. 2).

A mandrel 92 fits loosely through a hole in the bottom of the cup 7 6 and is retained by an enlarged head 94. A stack of Belleville spring washers 96 surrounding the mandrel 92 force the cup 76 against the ball 84 to lock the ball joint 24 so that it will not swivel or rotate. The Belleville springs 96 are backed by a washer 98 which is held in place by a threaded cylinder 100. The threaded cylinder 100 is attached to the body via a threaded disk 102 which is held in place by a retaining ring 104. A set screw 106 through a hole in the body 70 prevents the threaded disk 102 from rotating relative to the body 70. The set screw 106 also presses a small aluminum pellet 107 against the threads of the threaded cylinder 100 to lock it in place without damaging the threads. To build the ball joint 24, the parts are initially assembled as shown without compressing the Belleville springs 96. Once the ball joint 24 is assembled, the Belleville springs 96 are compressed with a force of approximately 1000 pounds by rotating the threaded cylinder 100 with a special torque wrench which engages two slots 108 in the end of the cylinder 100.

The cable 54 connects to the lower end of the mandrel 92. When force is applied to the cable 54 via the foot pedal 28, the cup 76 is pulled away from the ball 84 and allows the ball 84 to move in its plenum. This releases the locking ball joint 24 so that the working surface 22 can be swiveled or rotated.

Since the body 70 of the ball joint 24 is attached to the tilted top section 36 of the column, the entire ball joint 24 is inclined forward at 26° from the vertical. The top rear surface of the body 70 has a notch 110 in it to provide clearance for the ball shaft 86 so that the shaft 86 can attain a position which is 26° rearward from the central axis of the body 70. This allows the working surface 22 to move to a fully horizontal position as measured from the floor. Another deeper notch 112 on the front top of the body 70 allows the ball shaft 86 to move to a position which is 64° forward from the central axis of the body 70. This allows the working surface 22 to move to a fully vertical position as measured from the floor. The working surface 22 can be locked in any position between vertical and horizontal, as well as at compound angles which include some degree of side inclination. The use of the notches makes the working surface 22 particularly stable when it is locked in either the fully horizontal or fully vertical positions.

A short length of flexible corrugated ducting (not shown) attached to the underside of the flanged adapter 90 and fits loosely around the upper end of the body 70. This ducting serves as a boot to cover the locking ball joint 24 to protect it and keep out dirt.

Figure 5:
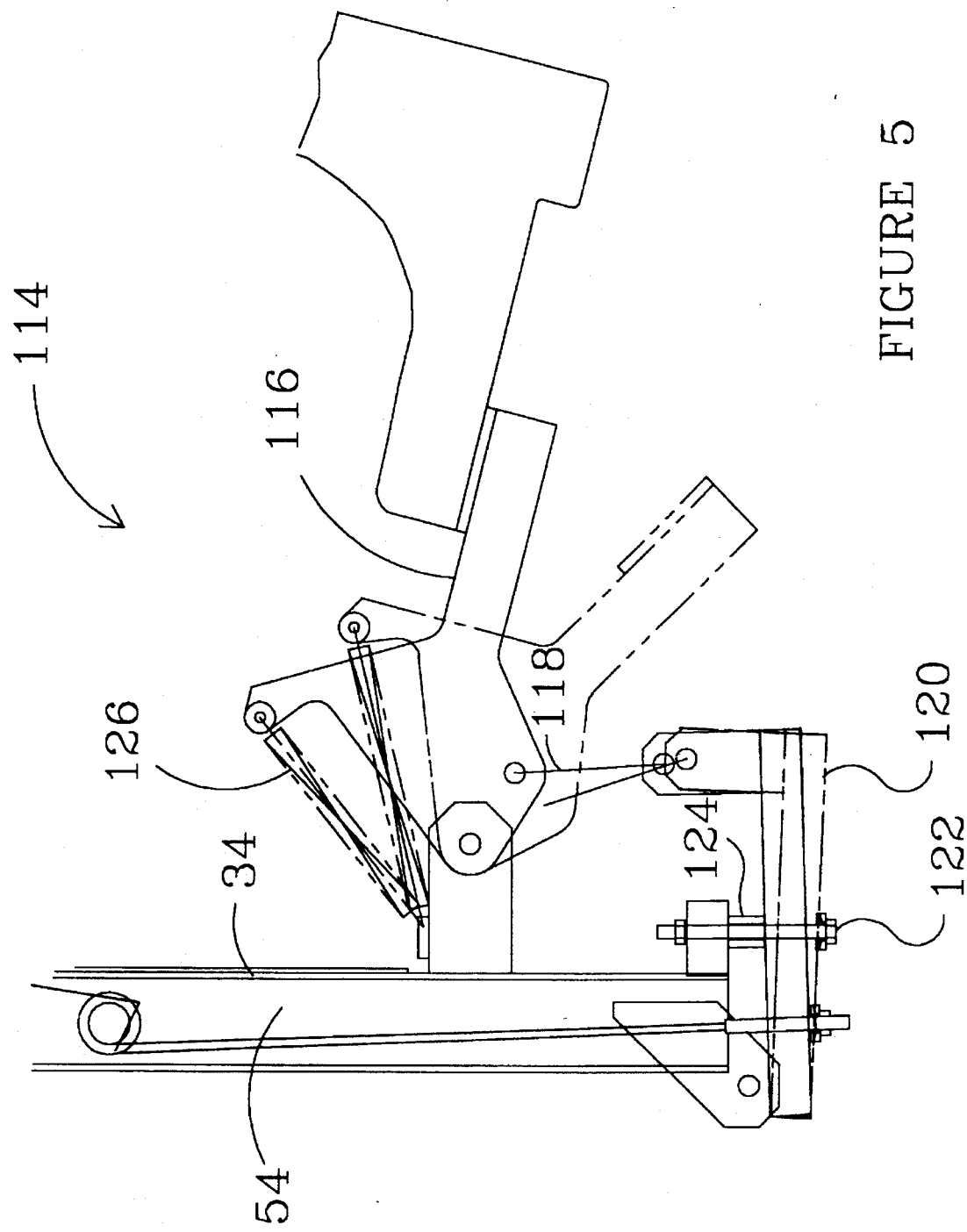
FIG. 5 shows an alternate compound lever foot pedal for the mechanically actuated embodiment of the positioning fixture.

FIG. 5 shows an alternate compound lever foot pedal 114 for the mechanically actuated embodiment of the positioning fixture 20. This variation has the advantage that sufficient force to unlock the ball joint can be applied with a much shorter lever arm on the pedal. A foot pedal 116 is pivotally connected to the central column 34. A push rod 118 is connected to the pedal 116 close to its fulcrum. The push rod 118 bears on the end of a lever 120 which is pivoted 1.5 inches rearward of the central axis of the column 34. The cable 54 attaches to the lever 120 below the centerline of the column 34. A bolt 122 which passes through the lever 120 acts as a stop to prevent over extension of the cable 54 and a cylinder 124 around the bolt 122 limits the upward movement of the lever 120. When the operator presses on the foot pedal 116, the mechanical advantage provided by the pedal 116 is multiplied by the mechanical advantage of the lever 120 to increase the force exerted on the cable 54. Toward the bottom of the pedal stroke, the changing angle of the push rod 118 with respect to the foot pedal 116 creates a toggle action which increases the mechanical advantage of the compound lever mechanism 114 even more. A light return spring 126 pulls the foot pedal 116 back to its rest position when it is released.

Figure 6:
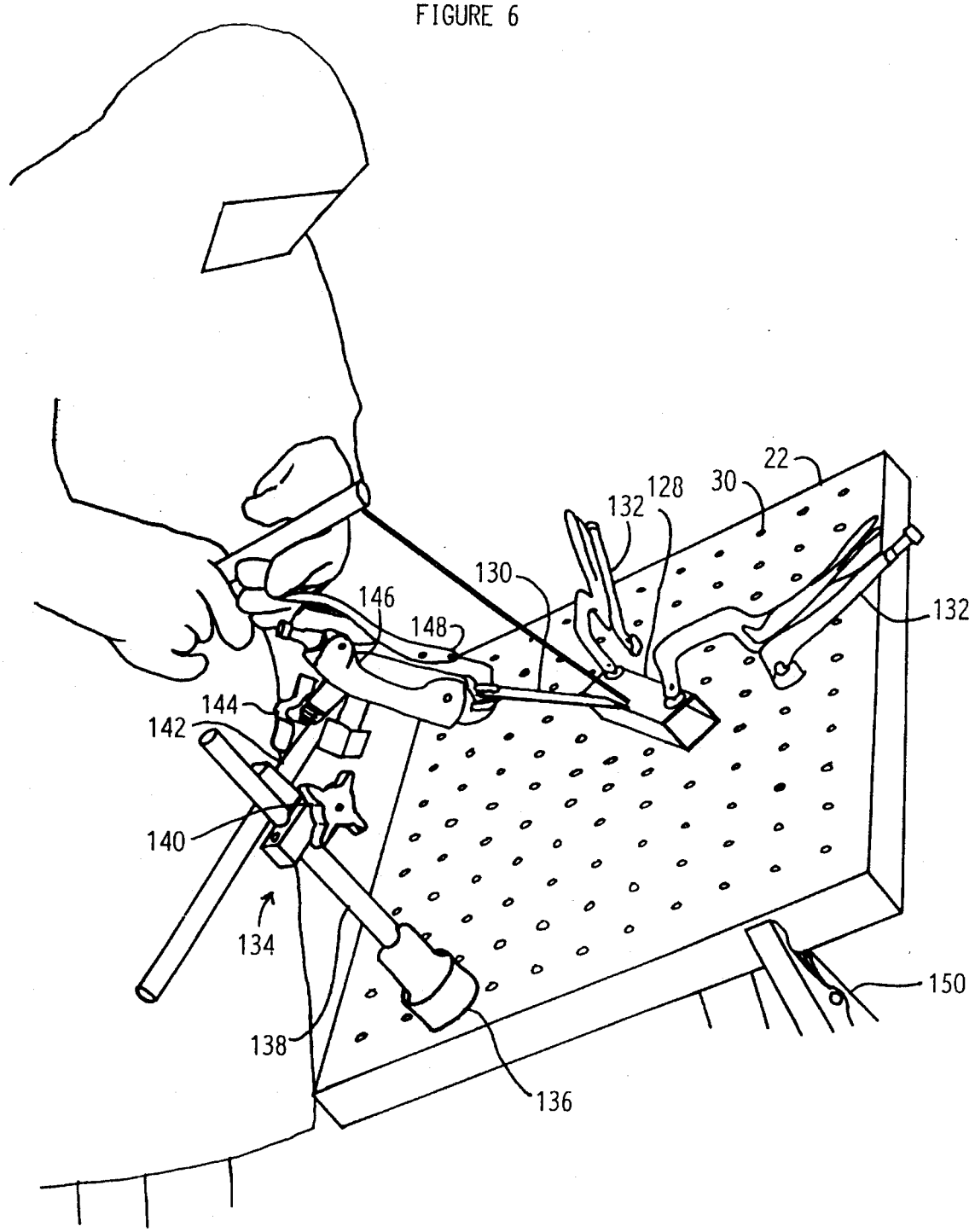
FIG. 6 shows a perspective view of the mechanically actuated embodiment of the positioning fixture in actual use.

FIG. 6 shows the positioning fixture 20 in use for a welding operation. A pair of workpieces 128, 130 are clamped to the working surface 22 in the desired spatial orientation for welding. In this case, the larger workpiece 128 is clamped to the work surface with two standard drill press clamps 132 which are bolted through the holes 30 in the working surface 22. The smaller workpiece 130 is held in place by a custom made articulating arm clamp 134. The clamp 134 has a base 136 which is bolted to the working surface 22 and a first length of rod 138 extending from the base 136. A second rod 142 is attached to the first rod 138 with a first swivel clamp 140. A second swivel clamp 144 pivotally attaches a saddle 146 to the second rod 142. The saddle 146 is specially made to receive a pair of Vice-Grip® pliers 148 which are held in place by four set screws. Other standard or custom made clamps can be used to clamp a multiplicity of parts onto the working surface 22. For example, the locking articulated arm described in U.S. Pat. No. 5,280,892 can be used in conjunction with the present invention.

Once the parts have been secured to the working surface 22, the entire assembly can be oriented to the most convenient welding angle by unlocking the ball joint 24 and tilting or rotating the working surface 2 2 to the optimum position. The positioning fixture 20 is shown in FIG. 6 with the working surface 22 oriented at a compound angle, tilted forward and to the side, with some degree of rotation. The ball joint 24 can be unlocked and the working surface 22 reoriented to a new position whenever it is desired and the relative spatial orientation of the parts will be maintained. Because the working surface 22 is made of conductive aluminum, the ground electrode clamp of the welder 150 can be attached directly to the working surface as shown when electrical welding techniques are being used.

Figure 7:
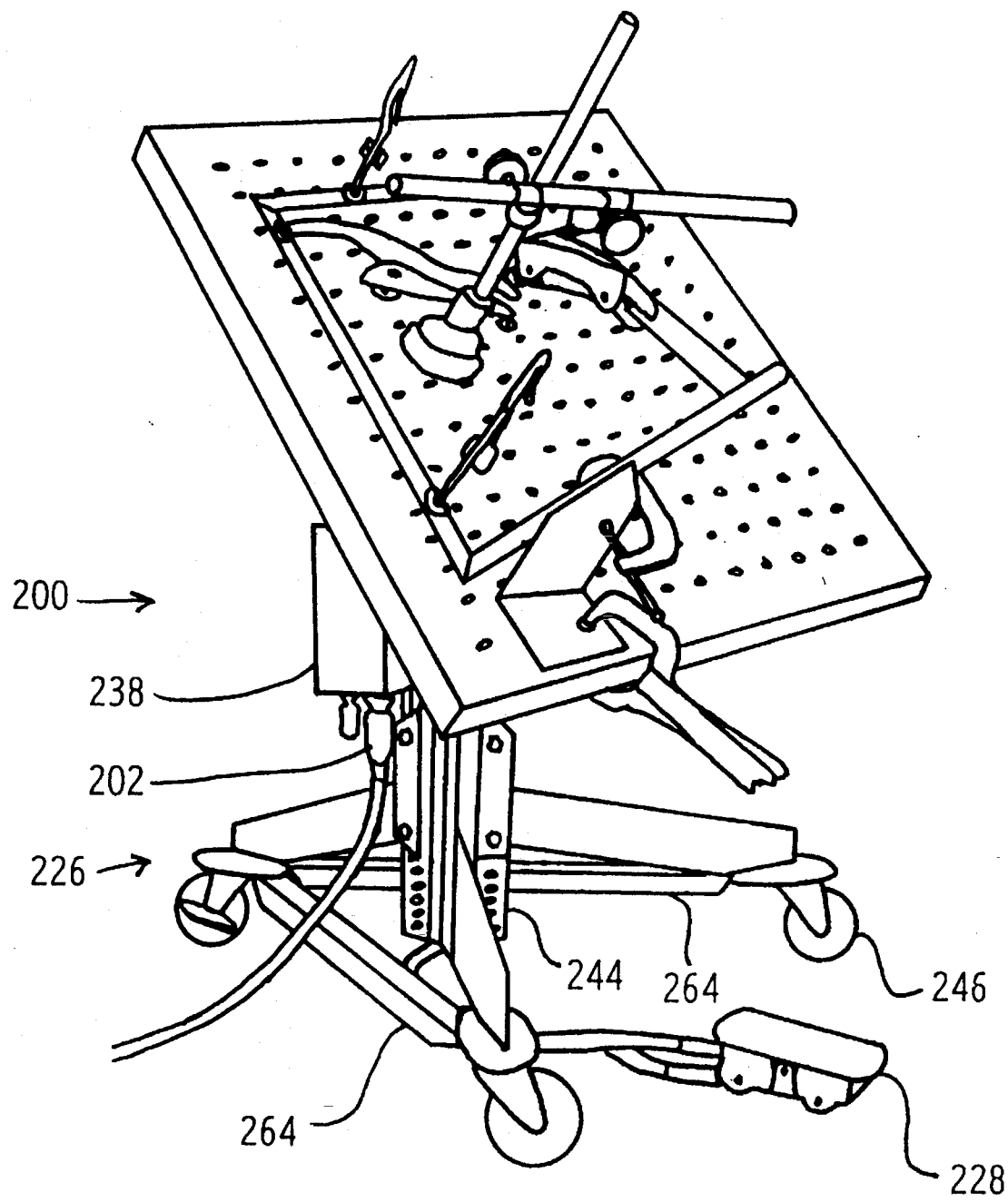
FIG. 7 shows a front perspective view of a pneumatically actuated embodiment positioning fixture.
Figure 9:
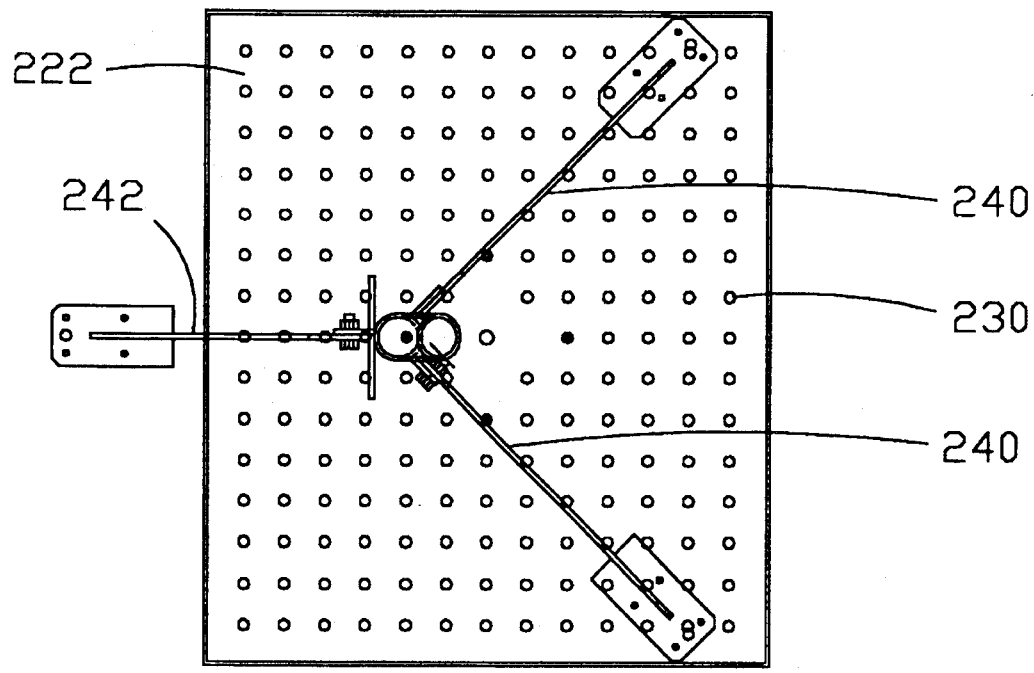
FIG. 9 shows a top view of the pneumatically actuated positioning fixture

FIG. 7 shows a second embodiment of the positioning fixture 200 of the present invention which has a pneumatically actuated locking ball joint 224. The pneumatically actuated embodiment of the positioning fixture 200 accommodates a somewhat larger working surface 222 because of the greater locking power of the pneumatically actuated locking ball joint 224. In the preferred embodiment, the working surface 222 measures 28 inches by 32 inches with a matrix of ½ inch holes 230 drilled on 2 inch centers. The positioning fixture 200 is shown here with multiple work pieces clamped to it using a variety of standard and custom clamping devices.

Figure 8:
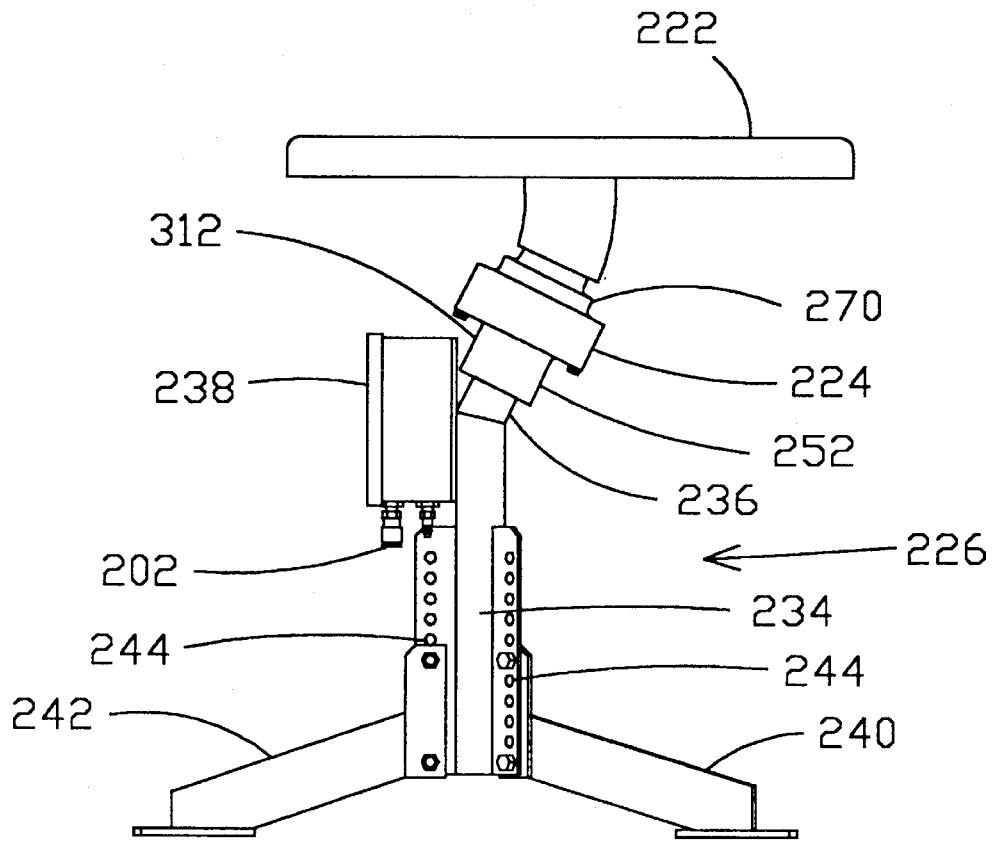
FIG. 8 shows a side view of the pneumatically actuated positioning fixture.

The work surface 222 is mounted onto a tripod base 226 by way of the pneumatically actuated locking ball joint 224 which can be seen in the side view in FIG. 8. The tripod base 226 is similar to the base of the first embodiment in that it has a central column with a lower vertical section 234 welded to a tilted upper section 236 inclined forward at 26° from the vertical. A short rearward extending leg 242 and two longer forward extending legs 240 are attached to the central column 234 by bolting them to three vertical flanges 244 which are welded to the central column 234. The flanges 244 each have a series of holes drilled in them to allow adjustment of the height of the fixture 200. The adjustable height of the base 226 also allows the base to be shortened to compensate for the extra height of the wheels 246 if the fixture 200 is mounted on the optional locking casters, as shown in FIG. 7. When the fixture 200 is used with casters, a pair of angle braces 264 are also added to further stabilized the base 226.

A control box 238 attached to the rear of the vertical portion of the column 234 serves multiple purposes. It provides a connection point for attachment of a compressed air source 202 and the pneumatic connections between the locking ball joint 224 and the foot pedal air valve 228. The control box 238 also serves as a mount for the nameplate and the operating instructions decal.

Figure 10:
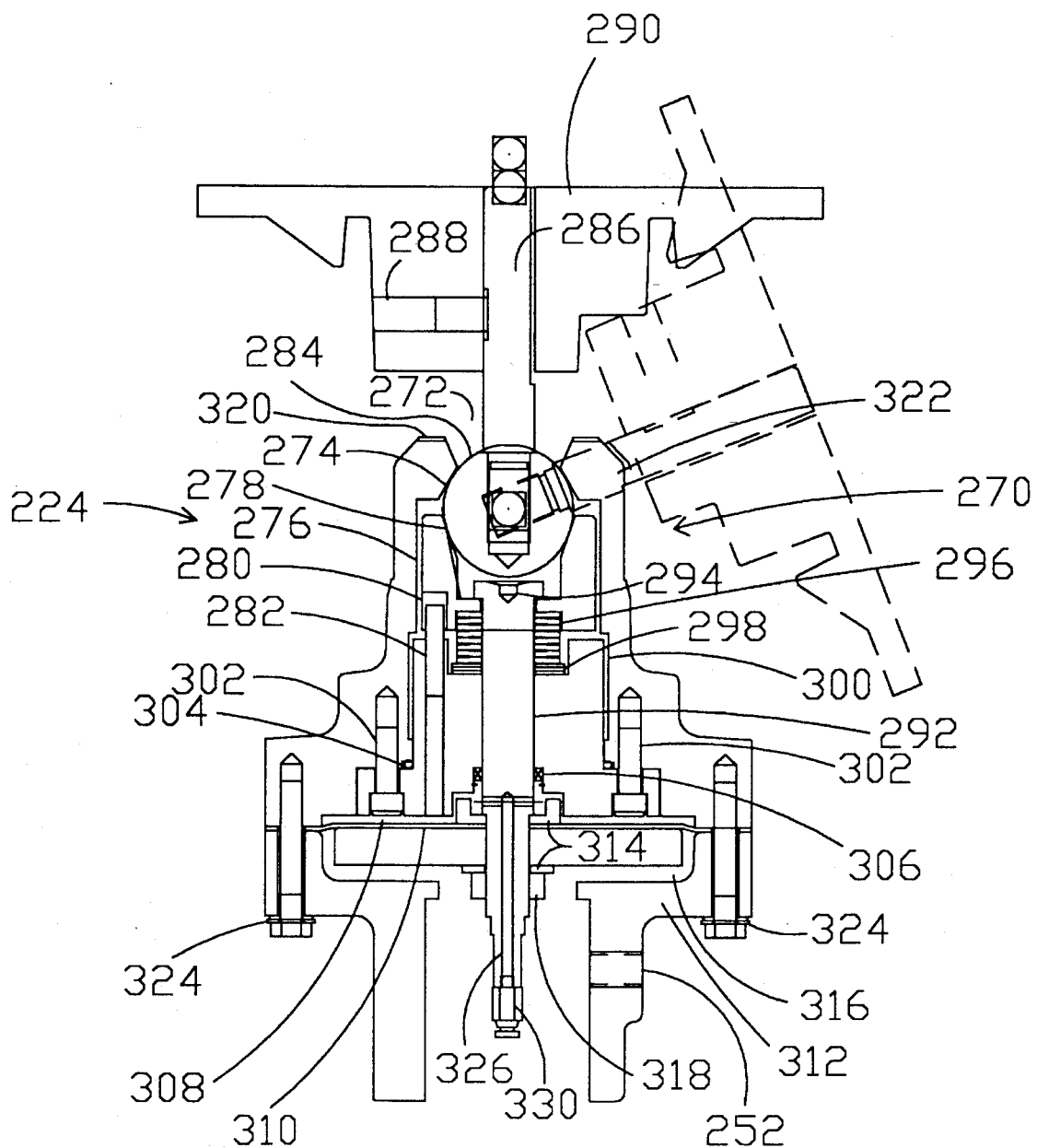
FIG. 10 shows a cross section of the pneumatically actuated locking ball joint.

The pneumatically actuated locking ball joint 224 is shown in detail in FIG. 10. The ball joint 224 has a cast aluminum housing 270 with a through bore 272. There is a conical surface 274 inside the upper end of the bore 272. A cup 276 with a conical upper surface 278 is slidingly received within the bore 272 of the housing. A ball 284 is held captive in the plenum created between the conical surface 274 of the body 270 and the conical upper surface 278 of the cup 276. The ball 284 has a shaft 286 extending from it through the opening 272 in the upper end of the body 270. The shaft 286 is attached by a set screw 288 to the flanged adapter 290 which, in turn, is attached to the working surface 222.

A mandrel 292 fits loosely through a hole in the bottom of the cup 276 and is retained by an enlarged head 294. A stack of Belleville spring washers 296 surrounding the mandrel 292 force the cup 276 against the ball 284 to lock the ball joint 224 so that it will not swivel or rotate. The Belleville springs 296 are backed by a retaining hub 300 which is bolted into the housing. The bolts 302 are used to compress the Belleville springs 296 during assembly. To compensate for machining tolerances and ensure the correct degree of compression one or more shim washers 298 can be added to the stack of springs 296 before assembly. A solid pin 282 which is press fit into a hole in the retaining hub 300 engages a loose fitting slot 280 in the cup 276 to prevent the cup 276 from rotating relative to the housing 270.

The retaining hub 300 is sealed to the housing 270 with an O-ring seal 304 and sealed to the mandrel 292 with a sliding seal 306. Behind the retaining hub 300 is a pressure chamber 308. A flexible diaphragm 310 covers the pressure chamber 308 and is held in place by a flange 312 which is bolted to the housing 270. The mandrel 292 passes through the diaphragm and is attached to the diaphragm by a pair of washers 314, a disk 316 and a threaded nut 318. The mandrel 292 has an internal air passage 326 which connects at one end to a pneumatic hose fitting 330 and at the other end to the pressure chamber 308. When the pressure chamber 308 is pressurized with compressed air by pressing the air valve pedal 228 shown in FIG. 7, the air pressure forces the diaphragm 310 against the disk 316 which transmits the force to the mandrel 292, pulling the cup 276 away from the ball 284. This unlocks the ball joint 224 so that the working surface 222 is able to pivot and rotate with respect to the tripod base 226.

An extension of the flange 312 which holds the diaphragm 310 in place also serves two other purposes. First, it acts as a stop behind the disk 316 so that the diaphragm 310 will not be damaged in case the pressure chamber 308 is ever overpressured. Second, it provides a cylindrical extension which fits over the upper end of the central column 236 and is held in place by a set screw 252.

The top surface of the pneumatically actuated locking ball joint 224 housing is also provided with a pair of notches 320,322 that allow the working surface 222 to move from a fully horizontal position to a fully vertical position as measured from the floor. The working surface 222 can be locked in any position between vertical and horizontal, as well as at compound angles which include some degree of side inclination.

The working surface 222 is electrically isolated from the base 2 2 6 by the diaphragm 310 and the insulating washers 324. The insulating washers 324 are made of nylon with a cylindrical body having an integral end flange. This prevents welding currents from being conducted through the ball joint 224 which could damage it.

A short length of flexible corrugated ducting (not shown) attached to the underside of the flanged adapter 290 and fits loosely around the upper end of the body 270. This ducting serves as a boot to cover the locking ball joint 224 to protect it and keep out dirt.

It should be noted that in both of the above described embodiments the ball joint 24,224 is normally in the locked condition and is only unlocked when force is applied to the mandrel 92,292. This feature provides two additional advantages. First of all, it makes the positioning fixture a fail safe device because if there is any failure such as cable breakage or loss of air pressure, the device will always fail in the locked condition. Secondly, it reduces the likelihood of operator error because the ball joint locks passively. It does not require an overt action by the operator or a minimum force applied to effectively lock the joint. These advantages are especially important when the positioning fixture is used to support heavy of fragile parts where a failure in the unlocked condition could be disastrous.

CONCLUSION, RAMIFICATIONS, AND SCOPE

While the foregoing description contains many specific details, these should not be construed as limitations on the scope of the invention, but rather as an exemplification of some of its preferred embodiments. Many other variations are possible and will no doubt occur to others upon reading and understanding the preceding description. For example a number of different actuator mechanisms could be devised to substitute for the pedal mechanisms described in the first embodiment or hydraulic pressure could be used instead of pneumatic pressure in the second embodiment without deviating from the spirit of the invention. Thus, the scope of the invention should be determined, not by the embodiments illustrated, but by the appended claims and their legal equivalents.

I claim:

1. A positioning fixture comprising:
    a tiltable working surface, said tiltable working surface having means for attaching at least one workpiece to said tiltable working surface,
    a base for supporting said tiltable working surface,
    a lockable ball joint connecting said tiltable working surface to said base, said lockable ball joint having two states; a locked state in which said tiltable working surface is locked in a desired position with respect to said base, and an unlocked state in which said tiltable working surface is able to be tilted and rotated with respect to said base,
    said lockable ball joint comprising:
        a housing having a through bore, a first conical surface located within said through bore, a second conical surface slidingly received within said through bore, means for attaching said housing to said base,
        a ball positioned between said first conical surface and said second conical surface, means for attaching said tiltable working surface to said ball,
        a spring means for urging said second conical surface against said ball when said lockable ball joint is in said locked state,
        and a compressing means for compressing said spring means and withdrawing said second conical surface from said ball when said lockable ball joint is in said unlocked state, comprising:
            a tensile member attached to said second conical surface,
            and a force multiplying pedal means for applying tension to said tensile member.

2. The positioning fixture of claim 1 wherein said force multiplying pedal means comprises:
    a pedal member having a pedal fulcrum, a footpad for applying force to said pedal member,
    a push rod member having a first end and a second end, said first end of said push rod member being attached to said pedal member intermediate said pedal fulcrum and said footpad,
    and a lever member having a first end and a second end, said first end of said lever member having a lever fulcrum, said second end of said push rod member being attached to said second end of said lever member, said tensile member being attached to said lever member intermediate said first end and said second end of said lever member.

3. The positioning fixture of claim 1 wherein said spring means comprises at least one Belleville spring.

4. The positioning fixture of claim 1 wherein said means for attaching said tiltable working surface to said ball comprises a shaft extending from said ball and means for attaching said tiltable working surface to said shaft, said shaft projecting through an opening in said housing, said opening having at least one notch of sufficient size to accommodate said shaft allowing said shaft to be positioned within said notch when said lockable ball joint is in said unlocked state.

5. The positioning fixture of claim 4 wherein said lockable ball joint has a central axis, said lockable ball joint being mounted on said base with said central axis at an angle of approximately 26° from vertical, said opening having a first notch which allows said shaft to pivot at an angle of 26° from said central axis such that said shaft is oriented vertically, and said opening having a second notch which allows said shaft to pivot at an angle of 64° from said central axis such that said shaft is oriented horizontally.

6. The positioning fixture of claim 5 wherein said working surface is oriented horizontally when said shaft is oriented vertically, and said working surface is oriented vertically when said shaft is oriented horizontally.

7. A positioning fixture comprising:
    a tiltable working surface, said tiltable working surface having means for attaching at least one workpiece to said tiltable working surface,
    a base for supporting said tiltable working surface,
    a lockable ball joint connecting said tiltable working surface to said base, said lockable ball joint having two states: a locked state in which said tiltable working surface is locked in a desired position with respect to said base, and an unlocked state in which said tiltable working surface is able to e tilted and rotated with respect to said base, said lockable ball joint comprising:

a housing having a through bore, a first conical surface located within said through bore, a second conical surface slidingly received within said through bore, means for attaching said housing to said base, a ball positioned between said first conical surface and said second conical surface, means for attaching said tiltable working surface to said ball, a mandrel attached to said second conical surface, at least one Belleville spring encircling said mandrel, said at least one Belleville spring urging said conical surface against said ball when said lockable ball joint is in said locked state, and a compressing means attached to said mandrel for withdrawing said second conical surface from said ball, thereby compressing said at least one Belleville spring when said lockable ball joint is in said unlocked state, said compressing means comprising:

a tensile member attached to said mandrel, and a force multiplying pedal means for applying tension to said tensile member.

8. A positioning fixture comprising:

a tiltable working surface, said tiltable working surface having means for attaching at least one workpiece to said tiltable working surface, a base for supporting said tiltable working surface, a lockable ball joint connecting said tiltable working surface to said base, said lockable ball joint having two states: a locked state in which said tiltable working surface is locked in a desired position with respect to said base, and an unlocked state in which said tiltable working surface is able to be tilted and rotated with respect to said base, said lockable ball joint comprising:

a housing having a through bore, a first conical surface located within said through bore, a second conical surface slidingly received within said through bore, means for attaching said housing to said base, a ball positioned between said first conical surface and said second conical surface, means for attaching said tiltable working surface to said ball, a mandrel attached to said second conical surface, at least one Belleville spring encircling said mandrel, said at least one Belleville spring urging said second conical surface against said ball when said lockable ball joint is in said locked state, and compressing means attached to said mandrel for withdrawing said second conical surface from said ball, thereby compressing said at least one Belleville spring when said lockable ball joint is in said unlocked state, said compressing means comprising:

a pneumatic actuator means attached to sad mandrel for withdrawing said second conical surface from said ball, thereby compressing said spring means, and a control valve means for supplying a flow of pressurized fluid to said pneumatic actuator means, said pneumatic actuator means comprising:

a pressure chamber, a diaphragm in fluid communication with said pressure chamber, said diaphragm being attached to said mandrel, said mandrel having an internal fluid passage, said internal fluid passage connecting said pressure chamber to said control valve means, whereby pressurized fluid supplied to said pressure chamber by said control valve means creates a force against said diaphragm, said diaphragm transmitting said force to said mandrel, thereby withdrawing with second conical surface from said ball and compressing said at least one Belleville spring when said lockable ball joint is in said unlocked state.

9. The positioning fixture of claim 8 wherein said means for attaching said tiltable working surface to said ball comprises a shaft extending from said ball and means for attaching said tiltable working surface to said shaft, said shaft projecting through an opening in said housing, said opening having at least one notch of sufficient size to accommodate said shaft allowing said shaft to be positioned within said notch when said lockable ball joint is in said unlocked state.

10. The positioning fixture of claim 9 wherein said lockable ball joint has a central axis, said lockable ball joint being mounted on said base with said central axis at an angle of approximately 26° from vertical, said opening having a first notch which allows said shaft to pivot at an angle of 26° from said central axis such that said shaft is oriented vertically, and said opening having a second notch which allows said shaft to pivot at an angle of 64° from said central axis such that said shaft is oriented horizontally.

11. The positioning fixture of claim 10 wherein said working surface is oriented horizontally when said shaft is oriented vertically, and said working surface is oriented vertically when said shaft is oriented horizontally.

12. The positioning fixture of claim 8 wherein upon pressurization of said pressure chamber said diaphragm moves in a direction opposite to the direction of fluid flow through said internal fluid passage in said mandrel.

* * * * *